United States Patent
Golberg et al.

(10) Patent No.: US 12,436,401 B2
(45) Date of Patent: Oct. 7, 2025

(54) POLARIZATION OPTICAL SYSTEM

(71) Applicant: Applied Materials Israel Ltd., Rehovot (IL)

(72) Inventors: Boris Golberg, Ashdod (IL); Haim Feldman, Nof-Ayalon (IL); Avishai Bartov, Hod Hasharon (IL); Ron Naftali, Shoham (IL)

(73) Assignee: Applied Materials Israel Ltd., Rehovot (IL)

( * ) Notice: Subject to any disclaimer, the term of this patent is extended or adjusted under 35 U.S.C. 154(b) by 107 days.

(21) Appl. No.: 18/104,230

(22) Filed: Jan. 31, 2023

(65) Prior Publication Data

US 2024/0255770 A1 Aug. 1, 2024

(51) Int. Cl.
  *G02B 27/28* (2006.01)
  *G01N 21/88* (2006.01)
  *G01N 21/95* (2006.01)
  *G02F 1/13363* (2006.01)

(52) U.S. Cl.
  CPC ....... *G02B 27/283* (2013.01); *G01N 21/8806* (2013.01); *G01N 21/95* (2013.01); *G02F 1/13363* (2013.01); *G02B 2207/117* (2013.01)

(58) Field of Classification Search
  CPC ....... G01N 2021/8848; G01N 21/8806; G01N 21/95; G01N 21/9501; G01N 21/956; G02B 2207/117; G02B 27/283; G02B 27/286; G02F 1/13363
  See application file for complete search history.

(56) References Cited

U.S. PATENT DOCUMENTS

| | | | |
|---|---|---|---|
| 2006/0007541 A1* | 1/2006 | Totzeck | G02B 21/002 359/484.08 |
| 2013/0003021 A1* | 1/2013 | Linden | G02B 27/283 359/489.08 |
| 2015/0285743 A1* | 10/2015 | Tung | G01N 21/21 356/369 |
| 2019/0162999 A1* | 5/2019 | Hegyi | G01J 3/45 |
| 2019/0353918 A1* | 11/2019 | Kim | G02B 27/283 |
| 2022/0113613 A1* | 4/2022 | Diana | G03B 21/208 |
| 2024/0159967 A1* | 5/2024 | Bunandar | G02B 6/126 |

* cited by examiner

*Primary Examiner* — Hina F Ayub
(74) *Attorney, Agent, or Firm* — Lowenstein Sandler LLP

(57) ABSTRACT

A polarizer system is described. The polarizer system comprises at least one polarization beam splitter, a polarization rotator, and a beam combiner. The at least one polarization beam splitter is positioned to receive input radiation beam and to split the input radiation beam directing a first beam portion having a first linear polarization orientation along a first path and a second beam portion having a second linear polarization orientation orthogonal to said first linear polarization orientation along a second path. The polarization rotator is located along said second path and configured to rotate polarization of said beam portion to be parallel to said first linear polarization orientation. The beam combiner is configured and positioned to combine said first and second beam portions to form a common beam having said first linear polarization orientation propagating along a selected optical path.

16 Claims, 2 Drawing Sheets

POLARIZATION OPTICAL SYSTEM

TECHNOLOGICAL FIELD

The Present disclosure is in the field of polarization manipulation of optical radiation, and specifically relates to power preserving polarizer system.

BACKGROUND

Polarization state or orientation is an important property of electromagnetic (EM) radiation. State of polarization may affect reflectivity of electromagnetic radiation from selected surfaces and interaction with materials in the volume below surface. For example, in EM radiation reflected from a surface, the reflected intensity of polarization components perpendicular (p-polarized) to the reflecting surface is greatly reduced with respect to reflected intensity of polarization components parallel (s-polarized) to the surface.

This and other characteristics of polarized EM radiation results in preferences to use EM radiation having a determined specific polarization state for many applications. To this end, various application utilizes one or more polarization filters positioned to polarize EM radiation emitted from a radiation source (light source, laser etc.). such polarization filter may include at least a linear polarization filter positioned to filter out selected linear polarization components, and providing linear polarization of output radiation. Additional polarizing elements may further be used to adjust, rotate, or change the polarization of EM radiation in any other way.

GENERAL DESCRIPTION

A typical issue associated with the use of polarization filters relates to loss of power. Linear polarization filters typically allow transmission of radiation components of one polarization orientation, while blocking transmission of radiation components with orthogonal polarization orientation. This may greatly reduce radiation power downstream of the polarization filter.

Accordingly, there is a need in the art for a novel polarizer system configuration. The polarizer system of the present disclosure comprises first and second paths for radiation components of orthogonal polarization orientations. Input radiation is split to first and second radiation components of orthogonal polarizations. A first radiation component having the desired polarization orientation propagates through a first path, and a second radiation component, having orthogonal polarization to the desired polarization orientation propagated through a second path toward a polarization rotator, e.g., half-wavelength plate, quarter wavelength plate, liquid crystal unit etc. Polarization orientation of the second radiation component is rotated to be aligned with polarization of the first radiation component. The first and second radiation components are than merged to propagate along a generally common path toward one or more objects to be inspected.

The polarizer system effectively directs all, or most of, the input radiation intensity into an output beam having a selected, defined, and linear polarization orientation. In this connection, using one or more additional polarization rotators, the output linear polarization orientation may be rotated to effectively any selected polarization state using any one of a half wavelength plate, a quarter-wavelength plate, other birefringent elements, liquid crystal layers, etc.

Generally, merging of the first and (rotated) second radiation components, may be associated with aligning direction of propagation thereof, while maintaining a general two-beam configuration, or allowing partial overlap between beam cross-sections. This is to limit interference patterns and/or speckles associated with interference of the first and second radiation components.

To this end the first and second radiation portion may be directed to propagate along parallel optical axes using a beam combiner. More specifically, the first and second radiation portion (following polarization rotation of the second radiation portion) may be propagating in intersecting directions and combined to propagate along a generally common optical axis using a beam combiner located at the intersection between the beams. In some embodiments, at least one of the first and second radiation portions may be diverted using a beam combiner to propagate in a direction of propagation aligned with that of the other radiation component using the folding mirror located at a distance d from point of intersection of the beams, where d may be determined in accordance with diameter of the radiation beams.

Thus, according to a broad aspect. The present disclosure provides a polarizer system comprising:

- at least one polarization beam splitter positioned to receive an input radiation beam and to split the input radiation beam directing a first beam portion having a first linear polarization orientation along a first path and a second beam portion having a second linear polarization orientation orthogonal to said first linear polarization orientation along a second path;
- a polarization rotator located along said second path and configured to rotate the polarization of said second beam portion to be parallel to said first linear polarization orientation; and
- a beam combiner configured and positioned to combine said first and second beam portions to form a common beam having said first linear polarization orientation propagating along a selected optical path.

According to some embodiments, the polarization rotator may comprise at least one of a half-wavelength plate, a quarter wavelength plate, and a liquid crystal.

According to some embodiments, the beam combiner may comprise one or more folding mirrors positioned to direct light propagation along said second path to coincide with propagation of light components along said first path.

According to some embodiments, the common beam having said first linear polarization orientation may be characterized by an effective beam cross section area being increased by a factor in a range between 1.4 and 2.5 of the cross section of the input radiation beam collected by the at least one polarization splitter.

According to some embodiments, the common beam may have a cross section generally elongated about on axis.

According to some embodiments, the common beam may have a total power being no less than 0.7 of the total power of input radiation beam collected by the at least one polarization splitter.

According to some embodiments, the polarizer system may further comprise a delay unit positioned in at least one of the first path or the second path.

According to some embodiments, the delay unit may be selectively tunable, to enable temporal alignment of the first and second beam portions at the output of said system.

According to some embodiments, the delay unit may be configured to provide temporal alignment of the first and second beam portions causing the first and second beam portions to overlap temporally when being output from the system.

According to some embodiments, the polarizer system may further comprise one or more optical elements positioned along at least one of first path and second path, said one or more optical elements having refractive and/or diffractive optical power and positioned to align focusing of the respective one of the first and second beam portions. In some embodiments comprising a delay unit positioned along said first path or said second path, said delay unit may be accompanied with one or more optical elements having refractive and/or diffractive optical power for refocusing the respective one or first and second beam portion.

According to another broad aspect, the present disclosure provides an optical inspection system comprising at least one light source system, an imaging arrangement, and a detection unit, and at least one polarizer system positioned between said at least one light source system and said imaging arrangement;

said at least one polarizer system comprises:
a polarization beam splitter configured to separate light emitted from said at least one light source system into two beam portions having different polarization orientation,
a polarization rotator positioned and adapted to rotate the polarization of one of said two beam portions to align the polarization orientation of the two beam portions, and
a beam combiner positioned and adapted to direct said two beam portions to propagate along a common general direction of propagation toward said imaging arrangement.

According to some embodiments, the optical inspection system may be configured for inspection of at least one of a semiconductor wafer, a photolithographic mask, or a reticle.

According to some embodiments, the optical inspection system may be configured as an optical microscope.

According to some embodiments, the polarization rotator may comprise at least one of a half-wavelength plate, a quarter wavelength plate, or a liquid crystal.

According to some embodiments, the beam combiner may comprise one or more folding mirrors positioned to direct light propagation along said second path to coincide with propagation of light components along said first path.

According to some embodiments, the two beam portions are output [of] from said polarizer system in the form of a common beam having a linear polarization orientation, said common beam is characterized by beam cross section being double of the received input radiation beam.

According to some embodiments, the common beam may have a cross section generally elongated about on axis.

According to some embodiments, the common beam may have a total power being no less than 0.7 of the total power of said received input radiation beam.

According to some embodiments, the optical inspection system may further comprise a delay unit positioned along an optical path of at least one of one of said two beam portions to temporally align radiation pulses of said two beam portions.

According to some embodiments, the said delay unit may be selectively tunable, to enable selectively temporally aligning radiation pulses of said two beam portions.

According to some embodiments, the delay unit may be configured to temporally align radiation pulses of said two beam portions to overlap temporally when being output from the at least one polarizer system.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
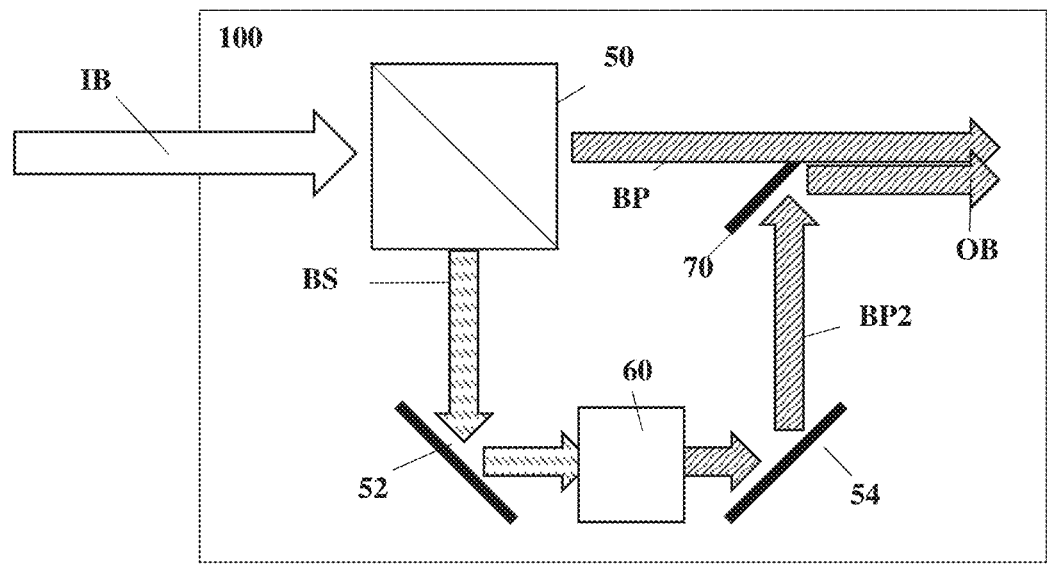
FIG. 1 illustrates a polarized system according to some embodiments of the present disclosure.

As indicated above, the present disclosure provides a polarizer system configured to polarize input beam of a selected wavelength range. FIG. 1 illustrates a system 100 according to some embodiments of the present disclosure. The system comprises a polarization beam splitter 50 positioned to receive input beam IB having certain polarization characteristics, and to split the input beam into first and second radiation components BP and BS having first and second linear polarization orientations being orthogonal between them.

Radiation beam portion BS may be directed using one or more reflecting surfaces 52 and 54 to pass through a polarization rotator 60. Polarization rotator 60 may for example be a half-wavelength plate, quarter wavelength plate, liquid crystal element or other suitable elements configured to rotate the polarization orientation of radiation beam passing therethrough. Generally, polarization rotator 60 may be a birefringent element positioned at a selected orientation angle to rotate linear polarization of beam BS by ±90 degrees to align polarization of the second radiation portion BP2 with that of the first radiation portion BP.

Following rotation of polarization orientation thereof, second radiation beam portion BP2 is directed to propagate alongside with first radiation beam portion BP to form output beam OB using beam combiner 70. Output beam OB is directed for illuminating selected one or more elements, and/or applying selected one or more optical functions. Generally, output beam OB is a polarized beam having selected linear polarization orientation. Also, differently than typical linear polarization filter, the energy of output beam OB is essentially similar to energy of input beam IB, other than small losses due to interaction with the optical elements in the system.

The example of FIG. 1 illustrates rotation of second radiation beam BS. It should be noted that generally, the present disclosure may utilize polarization rotation of either one of the first and second beam portions BP and BS. Accordingly, polarization rotation 60 may be place in optical path of first radiation beam portion BP and positioned to rotate the polarization thereof to align polarization thereof to polarization of second radiation beam component BS.

Further, polarization rotator 60 may be any element configured for rotating polarization of radiation beam of a selected wavelength range. Polarization rotator may be a half wavelength plate positioned with optical axis thereof aligned at 45 degrees to polarization orientation of radiation beam BS, to thereby rotate the polarization thereof by 90 degrees, to generate beam BP2. In some embodiments, polarization rotator may include one or more layers of liquid crystal elements configured to rotate the polarization of beam BS by 90 degrees. In some other embodiments, polarization rotator 60 may include one or more quarter wavelength plates, positioned and oriented together to rotate the polarization of beam BS by 90 degrees. In some further embodiments, polarization rotator 60 may be a prism polarization rotator and/or Faraday rotator.

The polarizer system 100 may be configured to operate with coherent or incoherent radiation, being unpolarized or partially polarized. Typically, when using input beam IB of incoherent radiation, first and second radiation beam portions BP and BP2 may be combined using any type of beam combiner 70. In embodiments that use coherent, or partially coherent, input beam IB, interference between the first and second beam portions BP and BP2 may generated various interference effects such as speckles in output beam OB. To solve this issue, the beam combiner 70 may be configured as a folding mirror 70 positioned to align propagation paths of radiation beam portions BP and BP2, while reducing spatial overlap between them. Spatial arrangement of output beam may thus be of a generally elongated cross section having a long axis and a short axis. In some embodiments, the output beam OB may have an elliptic cross section having a minor axis and a major axis. Typically, the minor axis may be a function of cross section diameter of input beam IB, and the major axis may be between larger by a factor of 1.4 to 2.5 of the minor axis.

In this connection, the polarizer system may operate with input light having any polarization conditions. For example, the polarizer system may receive input light having elliptical polarization, circular polarization, linear polarization, or generally unpolarized light. Generally, the polarizer system may be adapted for use with not polarized or partially polarized input light to provide polarized output light and maintain power of the output light with respect to input light.

Figure 2:
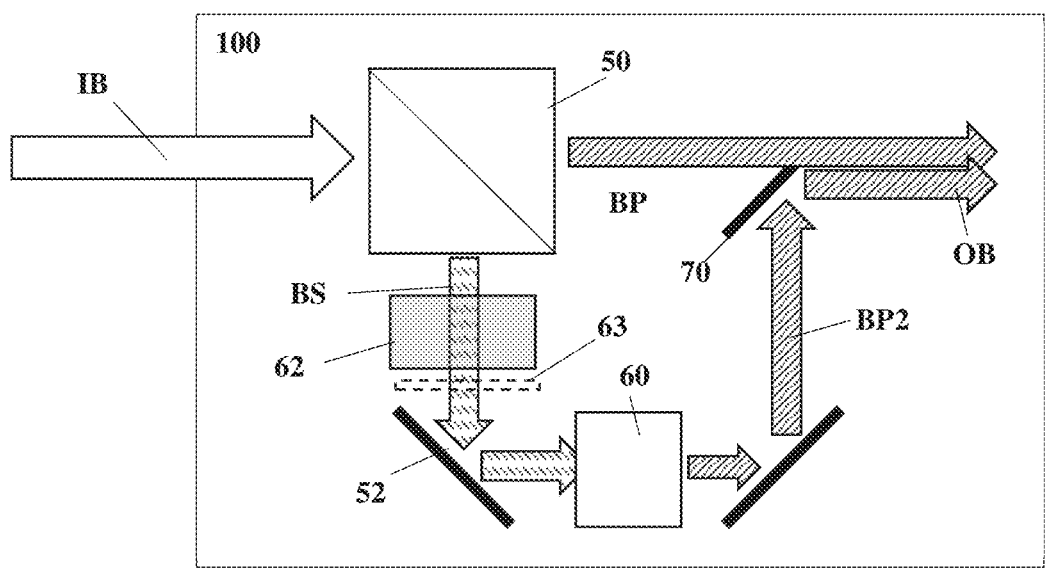
FIG. 2 illustrates a polarized system utilizing a delay line according to some embodiments of the present disclosure.

Reference is further made to FIG. 2 exemplifying an additional polarizer system configuration 100. The system exemplified in FIG. 2, further includes a delay unit 62 positioned in path of the second radiation beam component BS. The polarizer system may also include one or more optical elements 63 positioned upstream or downstream to the delay unit having refractive and/or diffractive optical power selected for refocusing of the delayed illumination. The delay unit 62 may be a transparent crystal, glass plate, or any other element generally transparent to the wavelength of illumination used in the input beam IB, that is configured to introduce certain optical path difference between the first BP and second BS radiation components.

The delay unit 62 is illustrated between the beam, splitter 50 and the polarization rotator 60. It should however be noted that the delay unit 62 may be located in any place in optical path of the second radiation beam component BS, between the beam splitter 50 and the beam combiner 70. Further, in some embodiments, the delay unit 62 may be placed in path of the first radiation beam component BP. The one or more optical elements 63 may have optical power and position selected to refocus the light beam BS and maintain divergence of the light beam propagating through the polarizer system 100.

Figure 3:
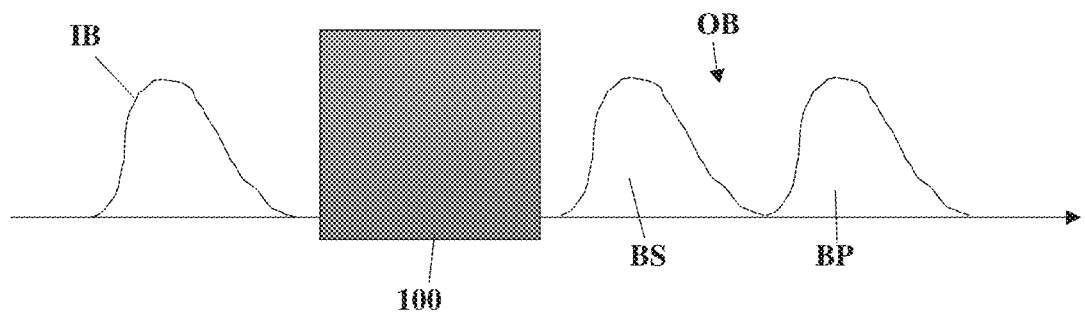
FIG. 3 exemplifies temporal splitting of a radiation pulse by polarizer system according to some embodiments of the present disclosure.

The delay unit may be used to add or remove selected variation in optical path between the first BP and second BS radiation components. The delay unit 62 may be used to compensate for optical path delay generated due to actual length of the optical path or passage through the polarization rotator to thereby align timing of the output beam OB to form a signal simultaneous pulse, or to generate a selected optical path difference generating an output beam having two consecutive pulses. This is exemplified in FIG. 3 exemplifying input pulse shape forming input beam BS, transmitted through a polarizer system 100 as described herein, and resulting in output pulse OB train having two pulses associated with first BP and second BS radiation beam components.

It should be understood that delay between the output pulses may be determined by optical path difference between the first BS and second BP radiation beam components. The use of a delay unit 62 may be used to adjust and tune the time delay between the radiation beam components.

Figure 4:
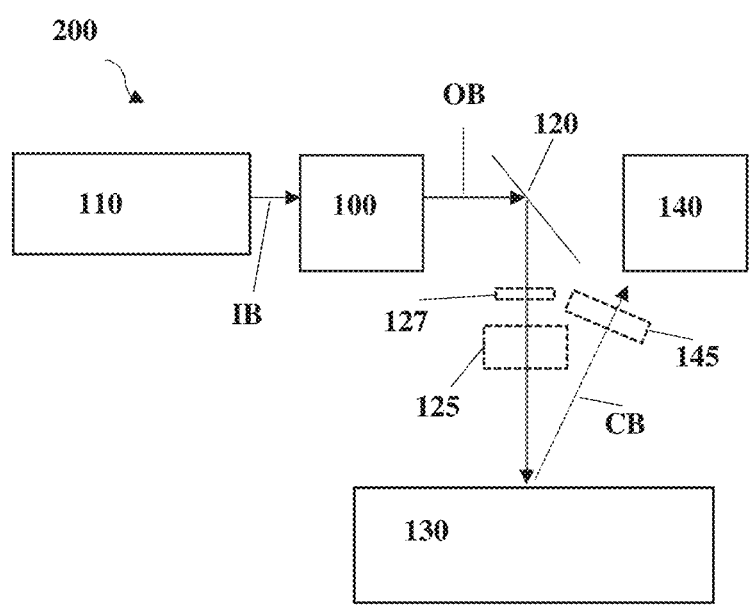
FIG. 4 illustrated schematically an optical inspection system utilizing a polarizer system according to some embodiments of the present disclosure.

Typically, polarizer system 100 of the present disclosure may be used in various inspection and metrology systems for providing polarized illumination while maintaining illumination intensity. FIG. 4 exemplifies schematically an inspection system 200. The system includes a light source 110, polarizer system 100 positioned to receive input beam IB from the light source system and to provide output beam OB of polarized light. The output beam OB may be manipulated by one or more optical elements such as mirror 120, one or more lenses 125, polarization rotator 127, or any other optical element needed to provide desired optical properties for one or more selected inspection systems. The output beam IB, being manipulated by optical elements or not, may be directed toward a sample to be inspected 130. The sample may be a wafer, mask, reticle, or any other type of sample to be inspected by system 200. Light reflected or scattered CB from the sample may be collected through a collection channel using a detection unit 140. The collection channel may also include one or more optical elements 145 such as one or more lenses, mirrors, diffraction grating, polarization filter, chromatic filter etc.

Optical inspection system 200 thus utilizes polarized illumination (of one or more wavelength ranges) for illuminating a sample 130 using defined polarization conditions of the illuminating radiation. More specifically, output beam OB may be directed at the sample 130 to provide illumination with linear polarization of a selected orientation. Additionally, or alternatively, one or more polarization rotators 127 may be used to convert the linearly polarized radiation OB into radiation beam having circular or elliptic polarization.

The use of polarized radiation in optical inspection systems, optical microscopic system or other measurement systems may simplify system configuration and enhance signal to noise ratio. The use of polarized illumination may be used to reduce interference effects between light portions of different polarizations.

Thus, the present disclosure provides an optical polarizer system configured to maintain optical power of input beam, while providing output beam having selected polarization orientation. The polarizer system may be configured to operate with one or more selected wavelength ranges including UV, visible and near infrared illumination. The optical polarizer may also enhance etendue of output beam by expending cross-section of the beam along at least one axis.

The present disclosure may further provide an optical inspection system configured for inspection of one or more selected samples using illumination of a selected polarization state. The optical inspection system thus utilizes one or more polarizer systems as described herein enabling polarizing optical beam while maintaining power of the beam as compared to typical conventional polarizer filters.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A polarizer system comprising:
   (a) at least one polarization beam splitter positioned to receive input radiation beam and to split the input radiation beam directing a first beam portion having a first linear polarization orientation along a first path and a second beam portion having a second linear polarization orientation orthogonal to said first linear polarization orientation along a second path;
   (b) a polarization rotator located along said second path and configured to rotate the polarization of said first beam portion to be parallel to said first linear polarization orientation;
   (c) a beam combiner configured and positioned to combine said first and second beam portions to form a common beam having said first linear polarization orientation propagating along a selected optical path; and
   (d) a delay unit positioned in at least one of the first path or the second path to temporally align radiation pulses of said first and second beam portions forming two pulses associated with the first and second beam portions.

2. The polarizer system of claim 1, wherein said polarization rotator comprises at least one of a half-wavelength plate, a quarter wavelength plate, and a liquid crystal.

3. The polarizer system of claim 1, wherein said beam combiner comprises one or more folding mirrors positioned to direct light propagation along said second path to coincide with propagation of light components along said first path.

4. The polarizer system of claim 1, wherein said common beam having said first linear polarization orientation is characterized by an effective beam cross section area being increased by a factor in a range between 1.4 and 2.5 of the cross section of input radiation beam collected by the at least one polarization beam splitter.

5. The polarizer system of claim 1, wherein said common beam has a cross section generally elongated about on axis.

6. The polarizer system of claim 1, wherein said common beam has a total power being no less than 0.7 of the total power of input radiation beam collected by the at least one polarization beam splitter.

7. The polarizer system of claim 1, wherein said delay unit is selectively tunable, to enable temporal alignment of the first and second beam portions at an output of said polarizer system.

8. An optical inspection system comprising at least one light source system, an imaging arrangement, and a detection unit, and at least one polarizer system positioned between said at least one light source system and said imaging arrangement;
   said at least one polarizer system comprises:
      a polarization beam splitter configured to separate light emitted from said at least one light source system into two beam portions having different polarization orientations,
      a polarization rotator positioned and adapted to rotate the polarization of one of said two beam portions to align the polarization orientations of the two beam portions, and
      a beam combiner positioned and adapted to direct said two beam portions to propagate along a common general direction of propagation toward said imaging arrangement; and
      wherein the optical inspection system comprises a delay unit positioned in path of at least one of said two beam portions, and configured to temporally align radiation pulses of said two beam portions forming two pulses associated with said two beam portions.

9. The optical inspection system of claim 8, configured for inspection of at least one of a semiconductor wafer, a photolithographic mask, or a reticle.

10. The optical inspection system of claim 8, configured as an optical microscope.

11. The optical inspection system of claim 8, wherein said polarization rotator comprises at least one of a half-wavelength plate, a quarter wavelength plate, or a liquid crystal.

12. The optical inspection system of claim 8, wherein said beam combiner comprises one or more folding mirrors positioned to direct light propagation along a second path to coincide with propagation of light components along a first path.

13. The optical inspection system of claim 8, wherein said two beam portions being output from said polarizer system in the form of a common beam that has a linear polarization orientation, said common beam is characterized by beam cross section being double of a received input radiation beam.

14. The optical inspection system of claim 13, wherein said common beam has a cross section generally elongated about on axis.

15. The optical inspection system of claim 13, wherein said common beam has a total power being no less than 0.7 of total power of said received input radiation beam.

16. The optical inspection system of claim 8, wherein said delay unit is selectively tunable.

* * * * *